March 30, 1965 3,175,547
FRIEDRICH-WILHELM KUCHENHART
DEVICE FOR DRESSING GRINDING DISCS
Filed Feb. 2, 1962 9 Sheets-Sheet 1

Fig.1

INVENTOR.
Friedrich Wilhelm Kuchenhart
BY

March 30, 1965

FRIEDRICH-WILHELM KUCHENHART 3,175,547

DEVICE FOR DRESSING GRINDING DISCS

Filed Feb. 2, 1962

INVENTOR.
Friedrich Wilhelm Kuchenhart
BY

March 30, 1965                                                3,175,547
FRIEDRICH-WILHELM KUCHENHART
DEVICE FOR DRESSING GRINDING DISCS
Filed Feb. 2, 1962                                             9 Sheets-Sheet 4

*Fig.4*

INVENTOR.
Friedrich Wilhelm Kuchenhart
BY

March 30, 1965

FRIEDRICH-WILHELM KUCHENHART

3,175,547

DEVICE FOR DRESSING GRINDING DISCS

Filed Feb. 2, 1962

INVENTOR.
Friedrich Wilhelm Kuchenhart
BY

March 30, 1965

FRIEDRICH-WILHELM KUCHENHART 3,175,547

DEVICE FOR DRESSING GRINDING DISCS

Filed Feb. 2, 1962

INVENTOR.
Friedrich Wilhelm Kuchenhart
BY

March 30, 1965

FRIEDRICH-WILHELM KUCHENHART 3,175,547

DEVICE FOR DRESSING GRINDING DISCS

Filed Feb. 2, 1962

INVENTOR.
Friedrich Wilhelm Kuchenhart
BY

March 30, 1965

FRIEDRICH-WILHELM KUCHENHART 3,175,547

DEVICE FOR DRESSING GRINDING DISCS

Filed Feb. 2, 1962

INVENTOR.
Friedrich Wilhelm Kuchenhart
BY 3,175,547
Patented Mar. 30, 1965

3,175,547
DEVICE FOR DRESSING GRINDING DISCS
Friedrich Wilhelm Kuchenhart, Neuss, Germany, assignor to Rohde & Dorrenberg, Dusseldorf-Oberkassel, Germany
Filed Feb. 2, 1962, Ser. No. 170,776
Claims priority, application Germany, Feb. 4, 1961, R 29,598; Oct. 18, 1961, R 31,306
23 Claims. (Cl. 125—11)

The present invention relates to a device for dressing grinding discs.

When grinding tools or the like for instance when grinding surfaces to be machined on helically or screw-shaped cutters, and when grinding the flanks of hobs, shapes are to be produced which require an irregularly curved profile on the grinding disc. To this end, for instance grinding discs are employed with which as generatrix of the surface to be produced by grinding, there is required a flank which is inclined to the axis of the grinding disc. The type and magnitude of the curvature of this flank changes with the diameter of the grinding disc, with the angle of screw thread, with the diameter of the cutter, with the location and magnitude of the surface to be produced by grinding and with the pitch angle which the surface forms with the cutter axis.

In view of the influence of these many factors, it makes no sense to calculate the profile to be ascertained, particularly inasmuch as the calculated values as to location and magnitude cannot be simply transferred to the profile of the grinding disc. The elimination of deviations from the required line on the work piece by correction by hand on the basis of ascertained or measured errors on the work piece is extremely difficult and time-consuming and also has the drawback of being insufficiently precise. Above all, these corrections cannot be precisely repeated.

The grinding-scratch method (Wetzritz method) occasionally employed in connection with the grinding of surfaces will permit a direct ascertainment of the desired profile with the exception of deeply located zones of the groove to be ground, but it is extremely time-consuming with each dressing operation.

There is also known the dressing of the flank of the grinding disc by devices with rigid templets, but this method requires that the above mentioned influential factors will not vary which can, for instance be realized only when mass producing of identical articles in a machine tool company, but in most instances is not encountered. When sharpening the undercut tool, by necessity its diameter changes and thus the required profile of the grinding disc so that generally this last mentioned principle cannot be employed.

It is, therefore, an object of the present invention to provide a device for dressing profiled grinding discs, which will overcome the above mentioned drawbacks.

It is also an object of this invention to provide a device for dressing profiled grinding discs which will make it possible to produce grinding discs which for all practical purposes have their contours formed in conformity with the required lines.

These and other objects and advantages of the invention will appear more clearly from the following specification in connection with the accompanying drawings, in which:

*General arrangement*

The general principle of the present invention consists in that by means of the device according to the invention, the flanks of the grinding discs are correctly profiled while considering all influential factors, and the produced shape can always identically be repeated in conformity with the coordinate system. More specifically, after a grinding operation on the work piece, a measurement is taken, and the errors ascertained by means of a coordinate system are corrected on a steel band templet which controls the dressing diamond and is adjustable as to shape.

When this method is employed in connection with the grinding for instance of a surface of a screw-shaped undercut cutter, the grinding disc will be profiled by a copying method by means of the diamond supported by a device fixedly mounted on the grinding machine. The steel band of the dressing device may, by means of adjusting members at certain coordinate distances, be curved to a certain shape within a certain range. For purposes of ascertaining this curved shape, the steel band may at the coordinate points be adjusted to zero so that it is rectilinear. In this position, by applying the copying method, the dressing diamond will produce a straight flank on the grinding disc, and by means of said flank a machining surface of the cutter is ground. Inasmuch as the machining surface when looking in axial direction of the cutter is helical, it will be appreciated that when measuring in radial section, a curved line will be obtained. By means of a well-known measuring device, the deviations of the obtained form from the desired straight line will at uniform coordinate distances be measured on the work piece. These values are transferred to the corresponding coordinate points of the dressing device by the adjusting members to the steel band. The magnitude of the adjustment can be directly read on a built-in measuring gauge. By means of the now curved steel band, the corrected shape can, by means of the copying method, be transferred to the grinding disc. The thus produced shape of the grinding surface of the thus dressed grinding disc now corresponds approximately to the ideal condition. With particularly high requirements as to the precision of the profile, the control measuring step may then be repeated, and the steel band may be further adjusted at the faulty coordinate points. In this way, deviations from the precise line required can be reduced to a few micromillimeters.

When producing a device according to the present invention, the axially adjustable dressing diamond and the feeling roller may be journalled in an oscillating or rocker member which, by means of a changeable bearing stud, is journalled in a supporting arm of a dressing carriage. The lever for moving the dressing carriage and templet carriage in opposite direction is provided with a control plate which, by means of a bolt, is connected to the dressing carriage and through the intervention of a slot member to the templet carriage. The control plate is tiltable about a pivot which, for purposes of changing the carriage path, is journalled in an adjustable horizontal carriage. In order to be able to adjust the device in conformity with the diameter of the grinding disc, the horizontal carriage is, by means of a vertical carriage, adjustable perpendicularly with regard to the direction of movement of the horizontal carriage.

According to a modification which is particularly simple in construction and easy to operate, the steel band which serves as templet and is adjustable by adjusting members and set screws, may be arranged in a templet housing on which a feeler bolt is guided which controls two dressing diamonds.

According to a practical embodiment of this device, the dressing diamonds are guided in a movable oscillating member or rocker arm, and the feeler bolt is guided in a movable tiltable lever which has an adjustable pivot point. For purposes of adjusting the device in conformity with the diameter of the grinding disc, the entire device is adjustable by means of a prismatic guide. The templet feeler carriage, and the dressing carriage are journalled at two different parts namely on a templet housing and on an oscillating member respectively and are interconnected by a tilting lever for producing the same or opposite proportional movement as to scale. This tilting lever may, for obtaining any desired transmission ratios, be adjustable by a prismatic guide in a stepless manner. By means of the two diamonds arranged in the dressing carriage, it is possible by tilting the entire device to dress the different right-hand and left-hand flanks on the tool, for instance on a hob.

Structural arrangement

Figure 4:
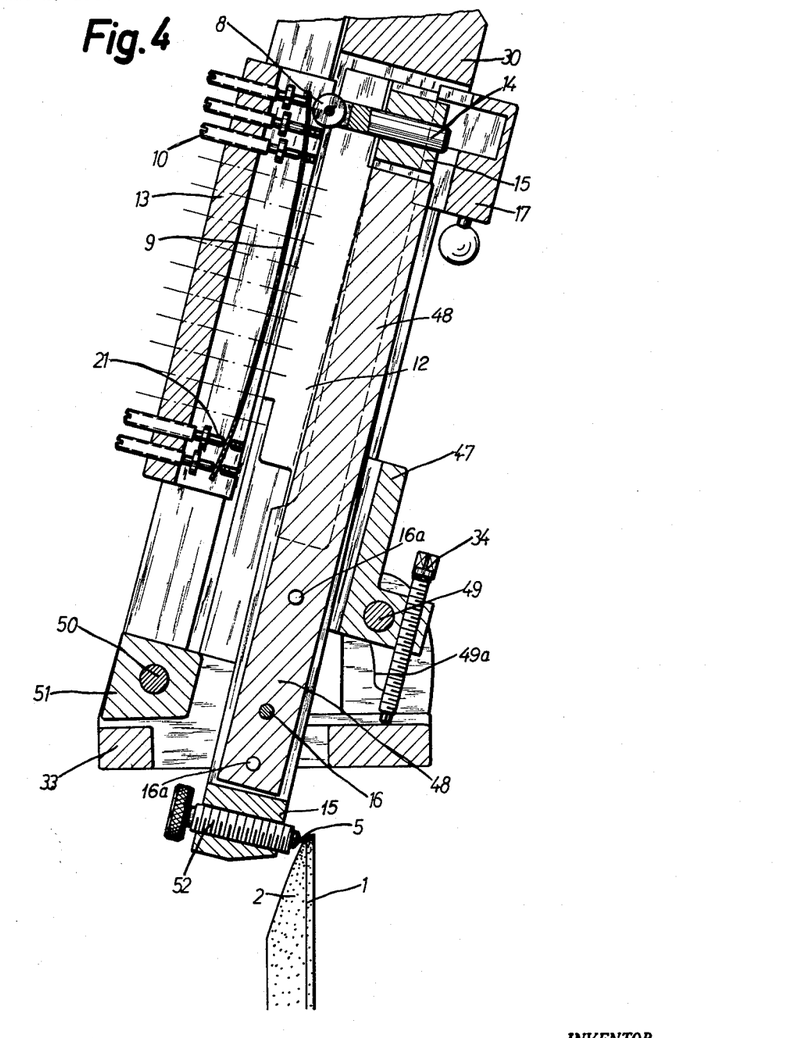
FIG. 4 is a section taken along the line IV—IV of FIG. 3.

The grinding disc to be dressed must, by means of its flank 2, grind surface 3 of cutter 4 which surface follows a helical line. In order to provide a helical flute with a face or true rake 3 that will be precisely radial and rectilinear, flank 2 of the grinding disc 1 must be curved. In order to produce this curvature, the diamond 5 will, when dressing, in addition to its longitudinal movement in the direction 6, be subjected to a transverse movement in the direction 7. This transverse movement is produced during the longitudinal movement by rolling a feeler roller 8 over an arched steel band 9 as shown in FIG. 4.

The arch of the steel band 9 is obtained by adjusting members 21 which are evenly spaced from each other and which may be subjected to pull or pressure by adjusting screws 10. In this way, the steel band 9 will, by means of vertical coordinates, be formed into any desired regular or irregular shape.

Figure 3:
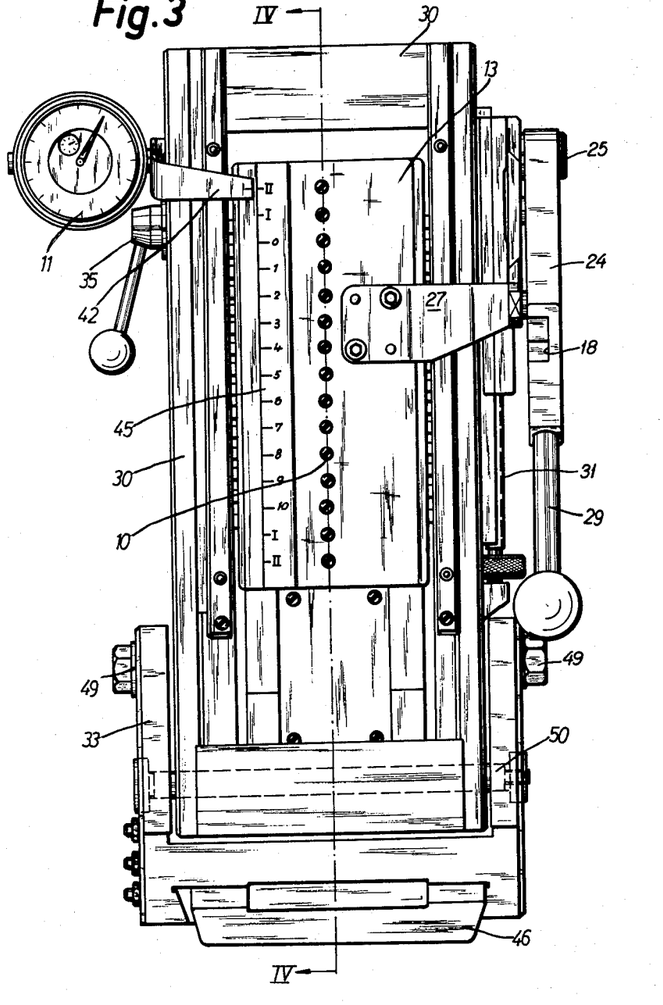
FIG. 3 shows a front view of the device of FIG. 1.

The coordinate values for this adjustment may be measured on the work piece, for instance on the cutter 4, by means of well-known measuring instruments and, after having been ascertained may, at the respective abscissa points, be directly transferred to the steel band 9 (FIGS. 3 and 6) by adjusting members 21 and a measuring gauge 11. A particular device will make it possible, by a stepless transmission system, to transfer the shape thus imparted upon the steel band 9 to any occurring length of the flank 2 of the grinding disc.

To this end, the device has two carriages, viz. the dressing carriage 12 and the template carriage 13, which are rectinlinear and parallel to each other. The dressing carriage 12 carries the transmitting elements for the carriage movement, and the template carriage 13 carries the steel band 9 with its adjusting members 21 and the set screws 10.

Figure 5:
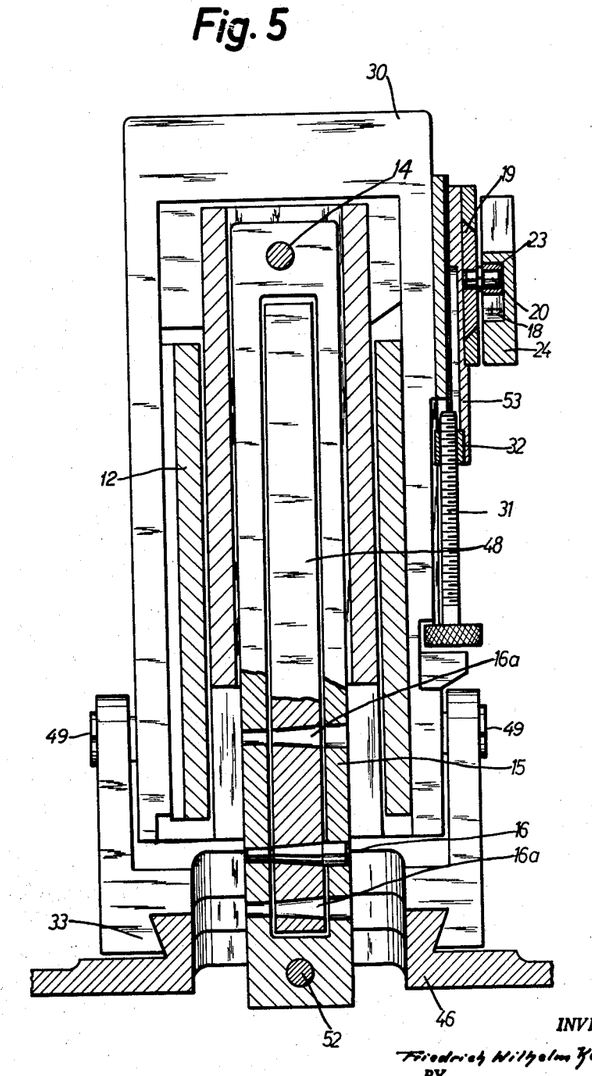
FIG. 5 is a partial section taken along the line V—V of FIG. 2.

The curvature imparted upon the steel band is transmitted as transverse movement 7 to an oscillating arm 15 (FIGS. 5 and 2) through the intervention of a feeler roller 8 mounted on the feeler roller support 14. The oscillating member or arm 15 carries at the lower end thereof the dressing diamond 5 which, in a suitable manner with its threaded supporting bolt 52, is finely adjustable axially of the bolt by turning of the bolt. The arm 15 is movable about a pivot bolt 16 which is firmly journalled in the supporting arm 48. Bolt 16 may be changed and placed into two further bores 16a and 16b in order to obtain different transmission ratios between the height of the curvature of steel band 9 and the transverse movement 7 of diamond 5. Bolt 16 may also be so arranged that the transmission ratio may be adjusted in a stepless manner.

Figure 2:
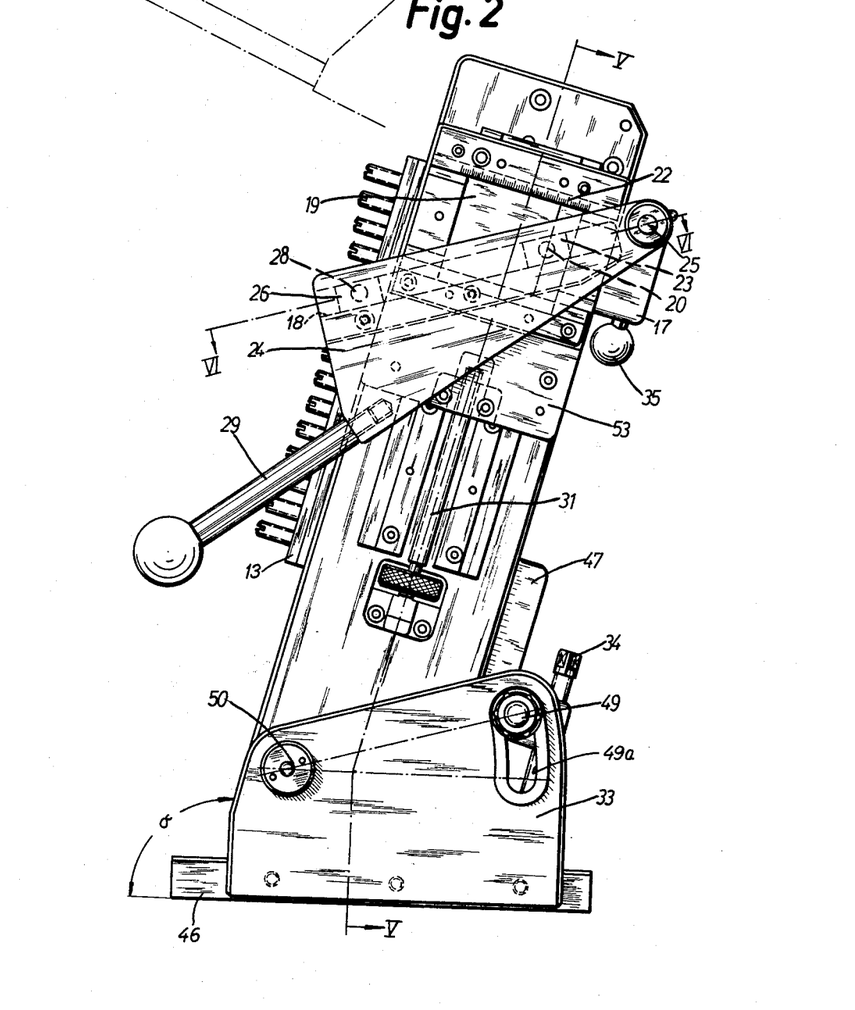
FIG. 2 is a side view of the device of FIG. 1.
Figure 6:
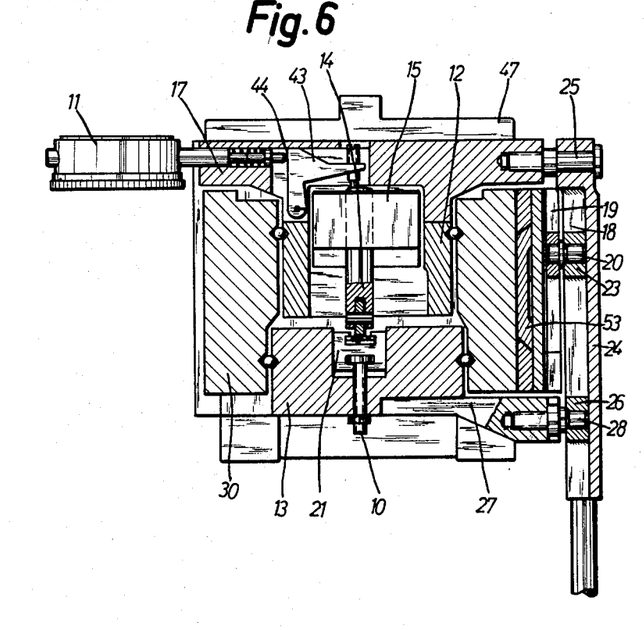
FIG. 6 is a partial section taken along the line VI—VI of FIG. 2.

In order to be able to transmit the constant length of the profile on the steel band 9 to the longitudinal movement 6 of the diamond at any required transmission ratio, the dressing carriage 12 may be moved in counter direction to the template carriage 13 at a previously calculated ratio. Inasmuch as stepless values are obtained therefor, also a stepless transmission has to be employed. The movement of the two carriages 12 and 13 is effected through the intervention of the control plate 24 on the hand lever 29 (FIGS. 2 and 6). Control plate 24 will, according to FIG. 6, be rotatable about bolt 25 which is fixedly supported by the dressing carriage 12. Two blocks 23 and 26 are movably mounted in a longitudinal groove 18 of the control plate 24. Block 23 rotates about pivot 20 which is fixedly mounted in a transverse carriage 19 and may be considered as neutral pivot point. Block 26 is rotatable about pivot 28 which is fixedly mounted in a transverse member 27 which, in its turn, is fixedly connected to the template carriage 13. When moving the manually operable lever 29, for instance from the bottom in upward direction (FIG. 2), the control plate 24 tilts about the neutral pivot 20. As a result thereof, block 23 is displaced in the direction toward bolt 25, and block 26 is displaced in the direction toward pivot 20 while the dressing carriage 12 moves downwardly, and template carriage 13 moves upwardly.

For varying the strokes of the carriages, it is merely necessary to displace the neutral pivot. Pivot 20 forming the neutral pivot point is fixedly mounted in the transverse carriage 19 which, according to FIG. 2, will, in its guiding means be displaceable toward the right or left and can be adjusted and arrested by markers 22. With each displacement, the lever arms on control plate 24 change between pivots 20 and 25, and 20 and 28 whereby the strokes of the two carriages 12 and 13 and also the magnitude of the movement is changed, which is carried out by diamond 5 in the direction 6.

Inasmuch as the grinding discs, in practice, have different diameters, while every grinding disc will, in view of its nature, wear and in view of the dressing operation will become smaller in diameter, it is necessary that the profile, with its ascertained definite particulars as to profile height and length, may be transferred to any desired location within the range of the grinding disc.

Also for this purpose, the neutral pivot 20 of the carriage system is displaced but perpendicular to the above-mentioned direction. This is effected by means of a longitudinal carriage 53 (FIG. 2). Mounted on said carriage 53 is a support nut 32 (FIG. 5) which may be moved upwardly or downwardly on a spindle 31 which is fixed in axial direction. This adjustment is effected in such a manner that the end points for the movement of the feeler roller 8 correspond to the end points for the movement of the diamond 5.

The aforementioned devices, as a unit, are tiltable about bolt 50 extending between upstanding flanges of a bore 33.

Figure 1:
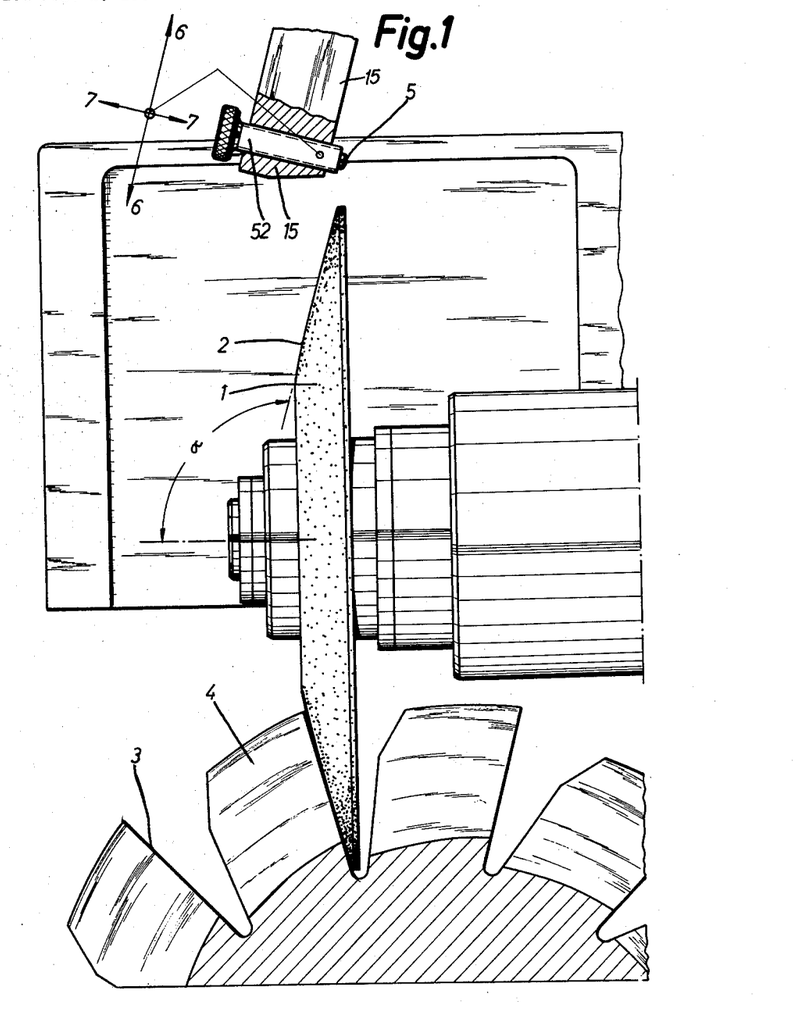
FIG. 1 diagrammatically illustrates the arrangement of a device according to the invention.

In order to be able also to vary the angle α of flank 2 (FIG. 1) with regard to the axis of the grinding disc in conformity with the respective requirements, the housing 30 is tiltable about a bolt 50 (FIGS. 3 and 4) within certain limits. To this end, a fine adjusting screw or set screw 34 is threaded in the holding member 47 and abuttingly rests upon the base 33 (FIG. 4). The housing is clamped in adjusted position by clamp bolt 49 passing through member 47 and extending through curved plate 49a in the upstanding side parts of the base 33.

For the basic adjustment of the device with regard to the precise radial, the device is displaced in base 33 by means of the prismatic base plate 46 so as to be parallel to the axis of the grinding spindle.

Figure 7:
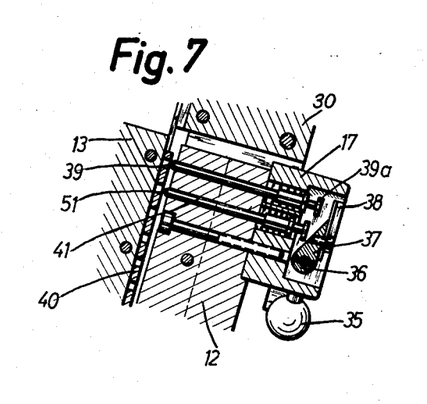
FIG. 7 is a partial section through the locking mechanism of the carriage.
Figure 8:
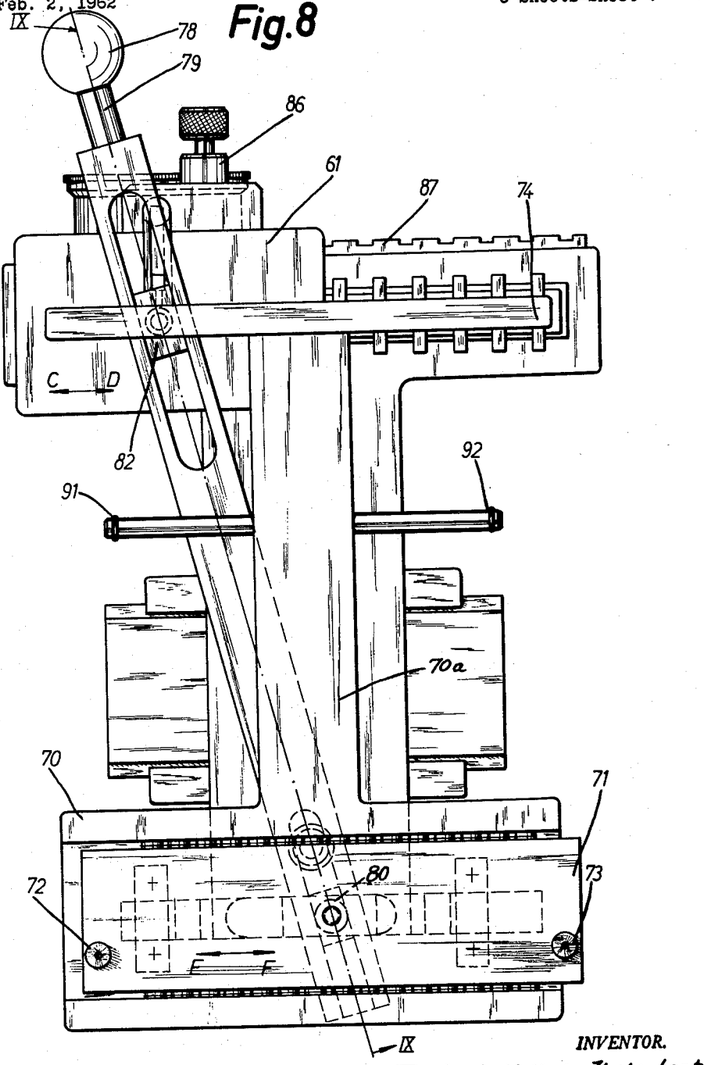
FIG. 8 is a front view of a modified device according to the invention.

The movements of the two main carriages, of the dressing carriage 12 and the template carriage 13, are not referred to any points of the fixed body of the device but are referred to each other in view of the changing center defined by the location of the neutral pivot 20. This applies to the limits of the path as well as to the individual adjusting positions which have to be precisely ascertained for the respective adjusting and control operations. This is made possible by the index group (FIG. 7) which is mounted in a control head 17 at the rear upper end of the dressing carriage 12. The control cam 37 is adapted to be actuated by means of a control hub provided with a handle 35 and by a control shaft 36 connected to said control hub. Cam 37 will, at the first fixed control position, press against the adjustable knob 39a of arresting pin 39 by means of its leaf spring 38. Pin 39, in its turn, presses by means of its round end face, against gauge strip 40 connected to the template carriage 13. When further rotating the control hub up to the next fixed control position, the leaf spring 38 bends, and the fixed portion of the control cam 37 will act against the second arresting pin 41. During this operation, pin 41 moves with its conical end 51 in the respective adjacent hole of the same perforated gauge strip 40.

The index group thus permits three possibilities of movement of the two carriages 12 and 13 with respect to each other, viz. the free unimpeded movement by each other, the resilient locking for finding the positions, and the locking of the two carriages relative to each other at the positions regardless of the locations thereof.

The respective position of the feeler roller 8 is indicated at the scale strip 45 of the template carrier by means of a pointer 42 (FIG. 3) connected to the control head 17. The position 0–10 shown in the drawing correspond to the measuring locations or points at the face of flute 3 of the cutter 4 where said face of flute was measured by the non-illustrated measuring device.

Mounted in control head 17 secured to the back of member 12 (FIG. 6) is a measuring device which transfers the movements of the feeler roller 8 to the measuring gauge 11 through the adjustable roller support 14, the angle lever 43, and the measuring tip 44. Gauge 11 will, by means of its normal and its millimeter pointer, indicate values of from 0 to 1100 which serve as dimensions of the profile ordinates.

The method of operation is thus characterized primarily in that, first, a produced profile is being measured. The measuring values obtained therefrom will then furnish an unequivocal indication concerning the location and magnitude of the still prevailing errors. These errors are then, by rotation of the adjusting screws 10 at the respective positions, translated by means of measuring gauge 11 into the dressing device whereby the ideal shape will then be obtained. The ascertainment of the ordinate values measured at the individual abscissa points will permit registration of these values for recurring identical cases and will also make it possible, over a time period, to draw a close net of machining instances, which will then, from the very start, make possible an immediate and far-reaching approximation to the ideal.

Figure 11:
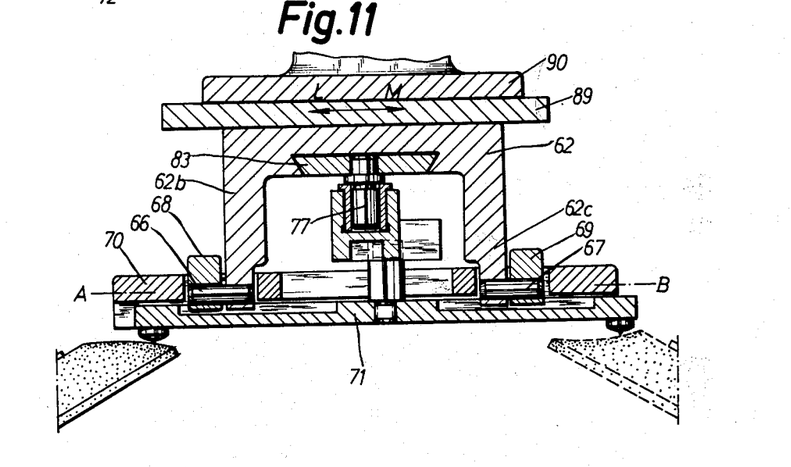
FIG. 11 is a section through the bearing means for the tiltable lever and the guiding means for the dressing carriage, said section being taken along the line XI—XI of FIG. 9.

With the embodiment illustrated in FIGS. 8 to 11, for purposes of producing a horizontal dressing movement according to the arrows E–F (FIG. 8) of the dressing diamonds 72 and 73, the template feeler carriage 61 is passed along the direction of the arrows C–D through a mounting on the template housing 62 which is as play-free as possible. The template housing 62 contains the steel band 63 which serves as template and which, by means of adjusting member 64 and set screws 65 according to FIG. 10 designated with the characters A to N, may be bent into any desired shape within certain limits. Perpendicularly to the movement of the template feeler carriage, the template housing 62 has a rigid connection 62a with the rotatably journalled guiding means of the dressing carriage 71, which guiding means is designed in form of an oscillatable arm 70. This journalling is effected by bolts 66 and 67 and by supports 68 and 69, as shown in FIG. 11. The guiding means for the dressing carriage, which guiding means is designed in form of the arm 70, is also tiltable to a slight extent about axis A–B (FIG. 11).

The dressing carriage 71 has connected to the two outer edges thereof the two dressing diamonds 72 and 73, which diamonds are arranged at the distance $a$ from the axis A–B. Carriage 71 is, by anti-friction bearing means guided in the tiltable arm 70 in a parallel manner and as play-free as possible. The dressing diamonds 72 and 73 will produce the left and right-hand flank shape which differ from each other of, for instance, a hub. This is effected by tilting the entire device.

Figure 9:
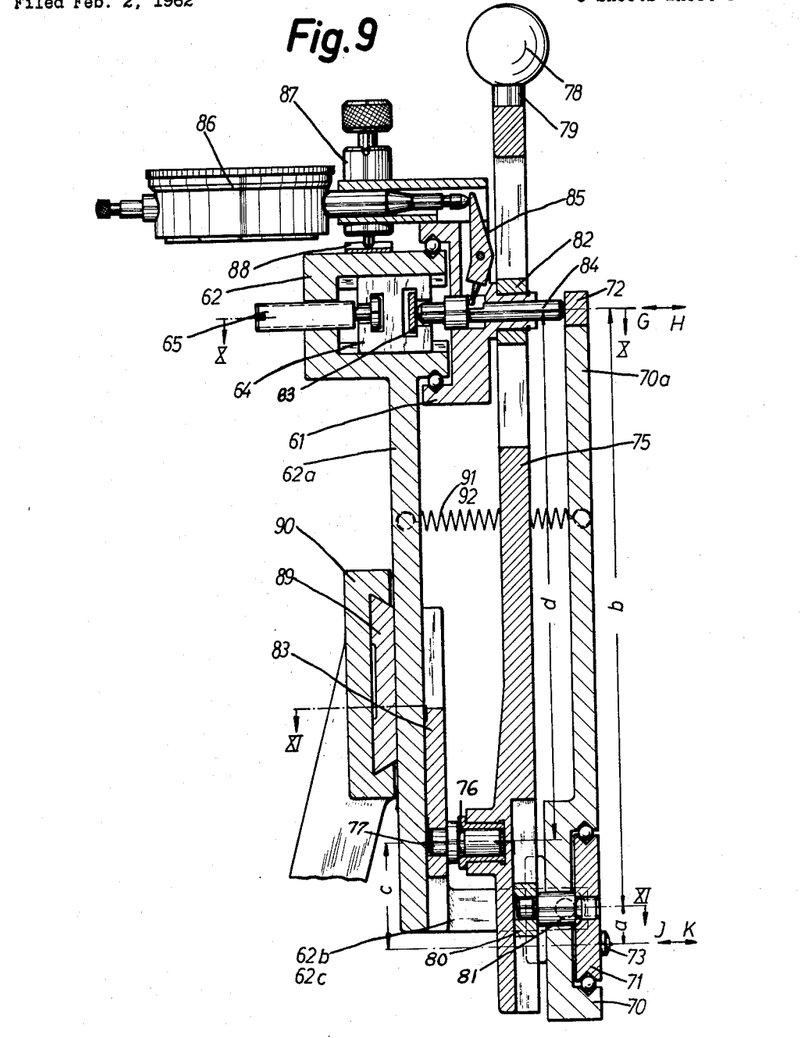
FIG. 9 represents a section taken along the line IX—IX of FIG. 8.
Figure 10:
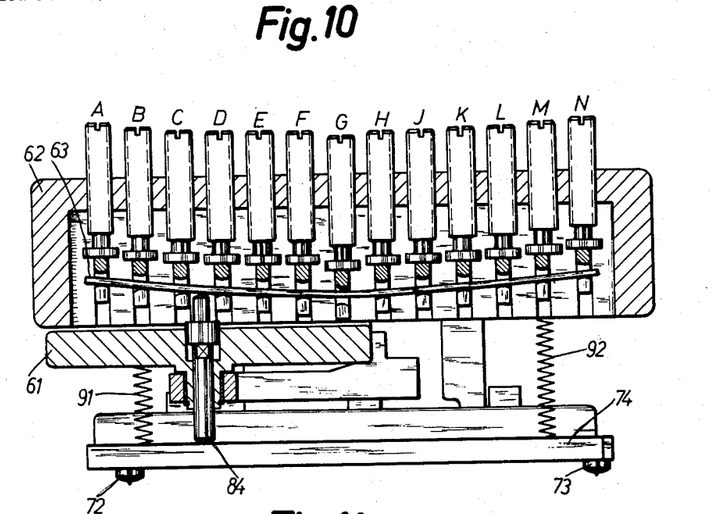
FIG. 10 is a section taken along the line X—X of FIG. 9 through the templet housing.

The feeler rail 74, which is arranged at the level of the steel band 63, is by means of a web 70a rigidly connected to arm 70 (FIG. 9). The relative movements between the feeler carriage 61 and the dressing carriage 71 are produced by a tilting lever 75 which, by means of a bushing 76 and a pivot 77 and a prismatic guide 83, is connected to the rigid web 62a (FIG. 9). This prismatic guide 83 makes possible a stepless change of the lever ratio $c:d$ (FIG. 9). This means that when guiding the feeler carriage 61 over the entire length of the template 63, the dressing carriage 71 with the dressing diamonds 72 and 73 will move only over a proportional distance.

When the lever 75 is tilted about its pivot 77 by means of the extension lever 79 with the ball knob 78, it will move block 80 sliding in its groove. This block will, by means of its pivot 81, drive the dressing carriage 71 in the direction of the arrows E–F (FIG. 8), whereas the horizontal movement of the template feeler carriage 61 along the direction of the arrows C–D (FIG. 8) will be produced by block 82 in the block guide of arm 75. By means of springs 91 and 92 (FIG. 10) the displacement values are transferred perpendicular to the movement of the dressing carriage 71.

This design of the device makes it possible, independently of each other, to determine the transmission ratios between the template length or the template curvature and the length or height of the profile to be produced by the diamonds. Whereas transmission ratio $a:b$ which is, for practical reasons constant, for instance 1:10, 1:20 or 1:50, the stepless adjustment of the ratio $c:d$ is possible and this makes it possible to produce any desired profile length.

The movement of the feeler bolt 84 in the direction of the arrows G–H (FIG. 9) and thus the proportionally enlarged movement in the direction of the arrows J–K of the dressing diamonds 72, 73 is, by means of a lever 85 conveyed to a measuring gauge 86 (FIG. 9) which has a reading precision of, for instance 1/100ths of a millimeter.

The feeler carriage 61 may, at the adjusting points of the steel band 63, be arrested by a device 87 in an index strip 88, for purposes of reading the adjusting values.

The entire device with the prismatic guide 89 is connected to a rigid support 90 of the grinding machine (FIG. 11).

It is, of course, to be understood that the present invention is, by no means, limited to the particular embodiments illustrated in the drawings but also comprises any modifications within the scope of the appended claims. Thus, all profiles which are definable by coordinates may be registered with this device and can, at the required transmission ratio, be translated to a grinding disc regardless of whether the profile is concave or convex, or whether both curvatures occur or whether proportional rectilinear contours are encountered.

What I claim is:

1. A device for dressing grinding discs comprising: a frame, a template carriage reciprocably mounted in said frame, a template mounted in the template carriage, a dressing tool supporting member, a follower on said tool supporting member following said template, a dressing carriage reciprocable in said frame, means pivotally supporting said tool supporting member in said dressing carriage, and means for effecting relative and simultaneous movement of said dressing carriage and said template carriage in said frame.

2. A device for dressing grinding discs comprising: a frame, a template carriage reciprocably mounted in said frame, a template mounted in the template carriage, a dressing tool supporting member, a follower on said tool supporting member following said template, a dressing carriage reciprocable in said frame, pivot means pivotally connecting the tool supporting member with said dressing carriage, means for adjusting the point of pivotal connection of the tool supporting member to said dressing carriage, and means for effecting relative and simultaneous movement of said dressing carriage and said template carriage in said frame.

3. A device according to claim 2, in which said follower is in the form of a roller on one end of said tool supporting member, said tool supporting member having means for supporting a dressing tool at the other end, and said means pivotally interconnecting said dressing tool supporting member and said dressing carriage being located intermediate said ends of said member.

4. A device for dressing grinding discs comprising: a frame, a template carriage reciprocably mounted in said frame, a flexible template mounted in said template carriage, means in the template carriage for adjusting the curvature of said flexible template, a dressing carriage reciprocably mounted in said frame, a dressing tool supporting member in said dressing carriage, a follower carried by said tool supporting member engaging said template, a control lever pivoted to said frame, and means pivotally connecting said control lever with said template carriage and with said dressing carriage whereby movement of said lever about its pivotal connection with said frame will actuate said carriages.

5. A device according to claim 4, in which the pivotal connection of said lever with said dressing carriage is provided on the opposite side of the pivotal connection of the lever with the frame from the pivotal connection of the lever with the template carriage whereby said carriages move in respectively opposite directions when the lever is actuated.

6. A device according to claim 4, in which said lever comprises a control plate, bolt means connecting said control plate to said dressing carriage and a slidable block connecting said control plate with said template carriage.

7. A device for dressing grinding discs comprising: a frame, a template carriage reciprocably mounted in said frame, a flexible template mounted in said template carriage, means in the template carriage for adjusting the curvature of said flexible template, a dressing carriage reciprocably mounted in said frame, a dressing tool supporting member in said dressing carriage, a follower carried by said tool supporting member engaging said template, a control plate pivotally connected to said dressing carriage, a slot in the control plate, blocks slidable in said slot, one of said blocks being pivotally connected with said template carriage, a member pivotally supporting the other of said blocks, means adjustably connecting said last-mentioned member to said frame, and means for rotating said control plate about its said pivotal connection with said dressing carriage.

8. A device according to claim 7, in which said member adjustably connected to said frame is adjustable thereon in a direction to change the relative position of the block pivoted thereto and the pivotal connection of the control plate to the dressing carriage and the block pivoted to the template carriage thereby to vary the stroke of the dressing tool in proportion to the length of the template passed over by said follower.

9. A device according to claim 7, in which the said member adjustably connected to said frame is in the form of a carriage adjustable transversely of the frame, and a second carriage adjustable perpendicularly to the direction of movement of the last-mentioned carriage and operable to adjust said first-mentioned carriage.

10. A device for dressing grinding discs comprising: a frame, a template carriage reciprocable in said frame, a flexible template mounted in the template carriage, means for adjusting the curvature of said template, a dressing tool supporting member, a follower on said tool supporting member following said template, means for effecting relative and simultaneous movement of said dressing carriage and said template carriage in said frame, a base support for said frame, means pivotally supporting said frame on said base support, and means for locking said frame in its respective adjusted positions on said base support.

11. A device according to claim 10, which includes a plate slidably receiving said base support.

12. A device according to claim 4, in which said dressing carriage is provided with a control head comprising a control cam and arresting pins operable by said control cam, and a perforated strip connected to said template carriage and adapted to be engageable by said arresting pins.

13. A device for dressing grinding discs comprising: a frame, a template carriage reciprocably mounted in said frame, a flexible template mounted in said template carriage, means in the template carriage for adjusting the curvature of said flexible template, a dressing carriage reciprocably mounted in said frame, a dressing tool supporting member in said dressing carriage, a follower carried by said tool supporting member engaging said template, a control lever pivoted to said frame, means pivotally connecting said control lever with said template carriage and with said dressing carriage whereby movement of said lever about its pivotal connection with said frame will actuate said carriages, said dressing carriage being provided with a control head, a pointed mounter on said control head, and a scale strip mounted on the template carriage, said pointer being movable over said scale strip thereby to indicate the position of the follower along the said template.

14. A device for dressing grinding discs comprising: a frame, a template carriage reciprocably mounted in said frame, a flexible template mounted in said template carriage, means in the template carriage for adjusting the curvature of said flexible template, a dressing carriage reciprocably mounted in said frame, a dressing tool supporting member in said dressing carriage, a follower carried by said tool supporting member engaging said template, a control lever pivoted to said frame, means pivotally connecting said control lever with said template carriage and with said dressing carriage whereby movement of said lever about its pivotal connection with said frame will actuate said carriages, a lever pivotally mounted in said dressing carriage, an indicator carried by said dressing carriage, said lever at one end engaging said indicating lever and at the other end being under the control of said follower whereby the indicator indicates the displacement of the follower by the said template.

15. A device for dressing grinding discs, comprising: a template housing, a flexible template mounted in the housing, means for adjusting the curvature of the template in the housing, a dressing tool supporting member, means pivotally supporting said member between the ends thereof on said housing, two spaced dressing tools reciprocably carried by said member at one end, a feeler bolt engaging said template and reciprocable therealong, and said feeler bolt being operatively connected with said tool supporting member at the other end thereof for controlling the movement thereof and of the two dressing tools carried thereby, and means for effecting simultaneous reciprocation of said feeler bolt along said template and said dressing tools along said supporting member.

16. A device for dressing grinding discs, comprising: a template housing, a flexible template mounted in the housing, means for adjusting the curvature of the template in the housing, a dressing tool supporting member, two spaced dressing tools carried by said member, a feeler bolt engaging said template and movable therealong, said feeler bolt being operatively connected with said tool supporting member for controlling the movement thereof and of the two dressing tools carried thereby, a member movable in said template support member and carrying said dressing tools, and a movable arm slidable on said feeler bolt and also slidably connected to said movable member and pivotally supported so that movement of said arm will simultaneously move said feeler bolt and said movable member.

17. A device according to claim 16, in which the said pivotal support of said movable arm is adjustable.

18. A device for dressing grinding discs, comprising: a template housing, a flexible template mounted in the housing, means for adjusting the curvature of the template in the housing, a dressing tool supporting member, two spaced dressing tools carried by said member, a feeler bolt engaging said template and movable therealong, said feeler bolt being operatively connected with said tool supporting member for controlling the movement thereof and of the two dressing tools carried thereby, a member movable in said template support member and carrying said dressing tools, a movable arm slidable on said feeler bolt and also slidably connected to said movable member and pivotally supported so that movement of said arm will simultaneously move said feeler bolt and said movable member, a guiding means for supporting said device, and said device being slidably mounted on said guiding means for adjustment in conformity with the diameter of the grinding disc being dressed.

19. A device for dressing grinding discs comprising: frame means, a template housing carried by the frame means, a flexible adjustable template in said template housing, a movable dressing tool support member carried by the frame in spaced relation to said template housing, a feeler bolt engaging said template, a feeler bolt carriage movably guided on said template housing, an arm slidably connected to said feeler bolt carriage and also slidably connected to said movable dressing tool support member, and pivot means pivotally connecting said arm to said frame, said pivotal means being adjustable in said frame so as to be positioned between the said sliding connections of said arm with said feeler bolt carriage and with said dressing tool supporting member for producing proportional movement of said feeler bolt carriage and said dressing tool supporting member selectively in the same direction or in directions opposite to each other.

20. A device according to claim 19, in which the said pivotal support for said arm in said frame is infinitely adjustable to provide for adjustment thereof in a stepless manner.

21. A device for dressing grinding discs, comprising: a template housing, a flexible template mounted in the housing, means for adjusting the curvature of the template in the housing, a dressing tool supporting member pivotally supported on said housing for movement relative thereto in a first plane, two spaced dressing tools carried by said member and reciprocable thereon in a second plane normal to said first plane, a feeler bolt engaging said template and movable therealong, said feeler bolt being operatively connected with said tool supporting member for controlling the movement thereof in said first plane and means for moving said feeler bolt along said template while simultaneously reciprocating said dressing tools along said tool supporting member, said entire device being tiltable about an axis extending at right angles to the direction of movement of said dressing tools in said support member to make possible the dressing of different contours, for example, the right and left flank ends of a tool by means of the two dressing tools of the device.

22. A device for dressing grinding discs, comprising: a template housing, a flexible template mounted in the housing, means for adjusting the curvature of the template in the housing, a dressing tool supporting member, two spaced dressing tools carried by said member, a feeler bolt engaging said template and movable therealong, said feeler bolt being operatively connected with said tool supporting member for controlling the movement thereof and of the two dressing tools carried thereby, an indicator, and a tiltable lever having one end engaging said indicator and its other end operatively associated with said feeler bolt for indicating the position of the feeler bolt.

23. A device for dressing grinding discs comprising: frame means, a template housing carried by the frame means, a flexible adjustable template in said template housing, a movable dressing tool support member carried by the frame in spaced relation to said template housing, a feeler bolt engaging said template, a feeler bolt carriage movably guided on said template housing, an arm slidably connected to said feeler bolt carriage and also slidably connected to said movable dressing tool support member, pivot means pivotally connecting said arm to said frame, said pivotal means being adjustable in said frame so as to be positioned between the said sliding connections of said arm with said feeler bolt carriage and with said dressing tool supporting member for producing proportional movement of said feeler bolt carriage and said dressing tool supporting member selectively in the same direction or in directions opposite to each other, an arresting device carried by said feeler bolt carriage for locking the feeler bolt carriage to the template housing at predetermined positions therealong, said arresting device being adapted for engaging an index strip carried by the template housing.

References Cited by the Examiner
UNITED STATES PATENTS

| | | | |
|---|---|---|---|
| 1,146,684 | 7/15 | Bauer | 51—127 |
| 2,282,038 | 5/42 | Davenport. | |
| 2,355,812 | 8/44 | Martindell. | |

J. SPENCER OVERHOLSER, *Primary Examiner.*

FRANK H. BRONAUGH, *Examiner.*